United States Patent
Ciarniello

(10) Patent No.: US 12,244,909 B2
(45) Date of Patent: Mar. 4, 2025

(54) MULTIMEDIA CONTENT PROTECTION

(71) Applicant: Telecom Italia S.p.A., Milan (IT)

(72) Inventor: Alberto Ciarniello, Rome (IT)

(73) Assignee: Telecom Italia S.p.A., Milan (IT)

( * ) Notice: Subject to any disclaimer, the term of this patent is extended or adjusted under 35 U.S.C. 154(b) by 230 days.

(21) Appl. No.: 17/783,404

(22) PCT Filed: Dec. 10, 2020

(86) PCT No.: PCT/EP2020/085429
§ 371 (c)(1),
(2) Date: Jun. 8, 2022

(87) PCT Pub. No.: WO2021/116247
PCT Pub. Date: Jun. 17, 2021

(65) Prior Publication Data
US 2023/0027170 A1    Jan. 26, 2023

(30) Foreign Application Priority Data
Dec. 12, 2019 (IT) .................. 102019000023844

(51) Int. Cl.
*H04N 21/8358* (2011.01)
*H04N 21/2187* (2011.01)
(Continued)

(52) U.S. Cl.
CPC ..... *H04N 21/8358* (2013.01); *H04N 21/2187* (2013.01); *H04N 21/4318* (2013.01); *H04N 2005/91335* (2013.01)

(58) Field of Classification Search
CPC .......... H04N 21/8358; H04N 21/2187; H04N 21/4318
See application file for complete search history.

(56) References Cited

U.S. PATENT DOCUMENTS 7,657,836 B2 * 2/2010 Pan ................ H04N 21/435
715/726
2014/0325550 A1 10/2014 Winograd et al.
(Continued)

FOREIGN PATENT DOCUMENTS

WO    2008/000894 A1    1/2008
WO    2017/211919 A1    12/2017

OTHER PUBLICATIONS

Jan. 13, 2021—(WO) International Search Report—App PCT/EP2020/085429.
(Continued)

*Primary Examiner* — Mishawn N. Hunter
(74) *Attorney, Agent, or Firm* — Banner & Witcoff, Ltd.

(57) ABSTRACT

A method is disclosed for protecting a multimedia content distributed by a content service to a user device, the multimedia content being related to a live event, wherein the method comprises, during the live event: identifying a significant segment of the live event; generating a trigger signal associated with the significant segment; at the user device, on the basis of the trigger signal, generating a marking comprising information identifying the user device; and, at the user device, applying the marking to a selected portion of the multimedia content, the selected portion corresponding to the significant segment of the live event.

20 Claims, 5 Drawing Sheets

(51) Int. Cl.
*H04N 21/431* (2011.01)
*H04N 5/913* (2006.01)

(56) References Cited

U.S. PATENT DOCUMENTS

2015/0016661 A1* 1/2015 Lord ............... H04N 21/42203
   382/100
2017/0339472 A1 11/2017 Hunacek et al.

OTHER PUBLICATIONS

Federation for the Protection of Audiovisual and Multimedia Content (FAPAV), Summary of the 2018 Survey on Audiovisual Piracy in Italy, Jul. 11, 2019, 15 pages, English translation not available; URL: <https://fapav.it/wp-content/uploads/2019/07/SINTESI-INDAGINE-2018_FAPAV-Ipsos.pdf> (Statement of Relevance on p. 1 of Application).

2018 Special 301 Report, Executive Office of the President of the United States, Office of the U.S. Trade Representative, 86 pages; URL: <https://ustr.gov/sites/default/files/files/Press/Reports/2018%20Special%20301.pdf>).

Joseph Oren, "Cost Effective Watermarking in the Set Top Box", Jan. 1, 2008 (Jan. 1, 2008), XP055326878, pp. 65-78, Retrieved from the Internet on Dec. 7, 2016: <URL:http://www.nctatechnicalpapers.com/Paper/2008/2008-cost-effective-watermarking-in-the-set-top-box/download>.

* cited by examiner

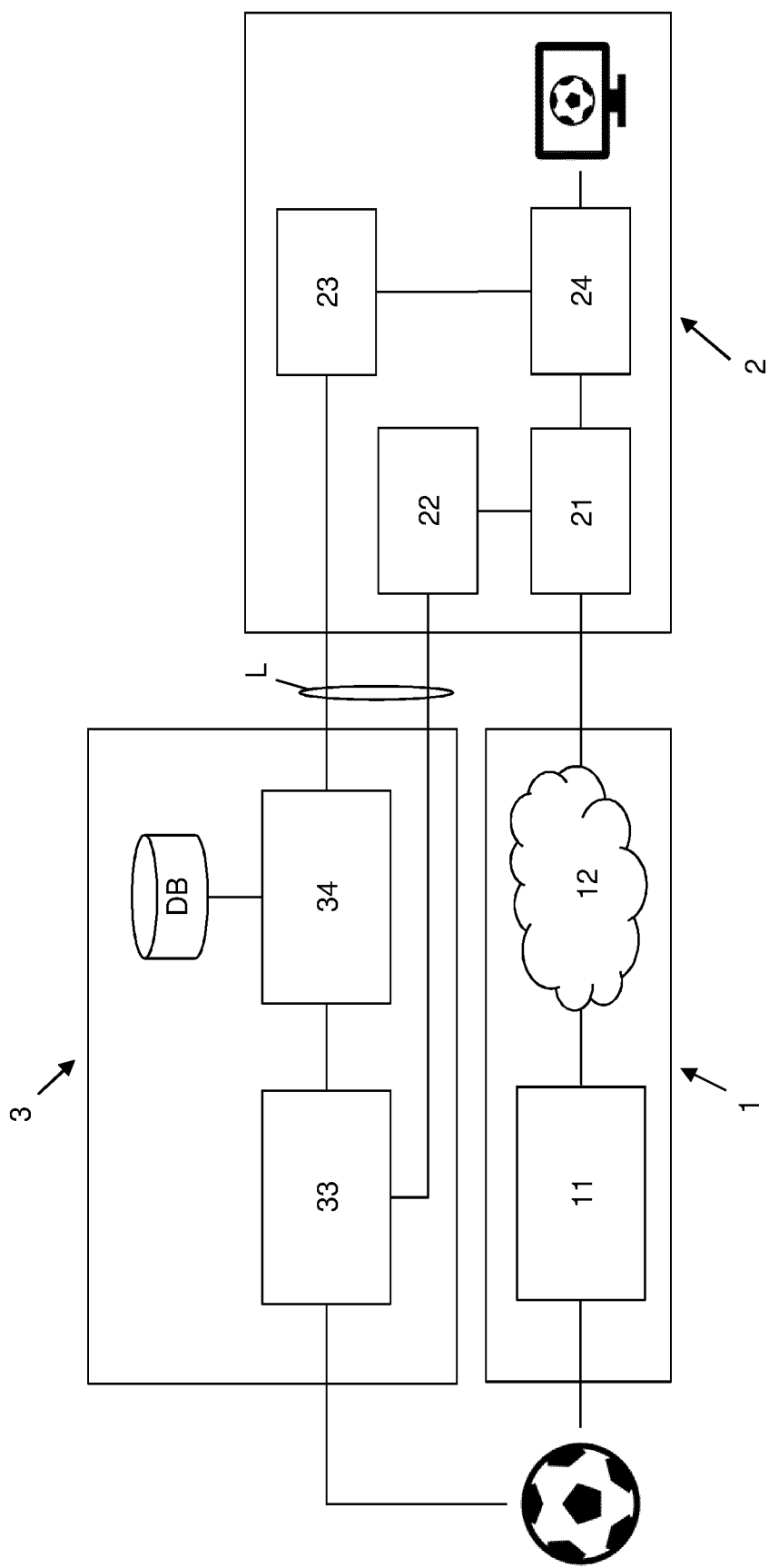

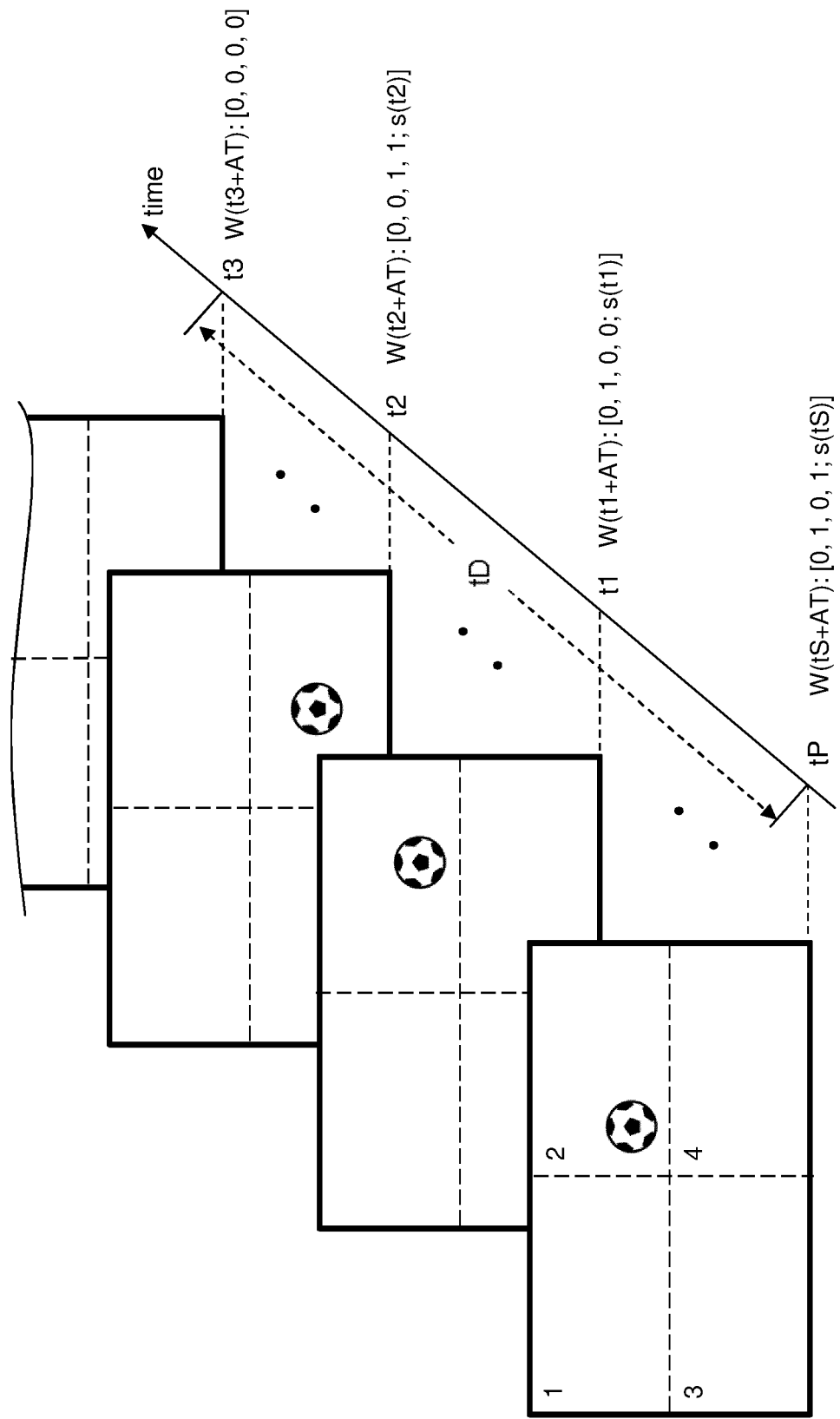

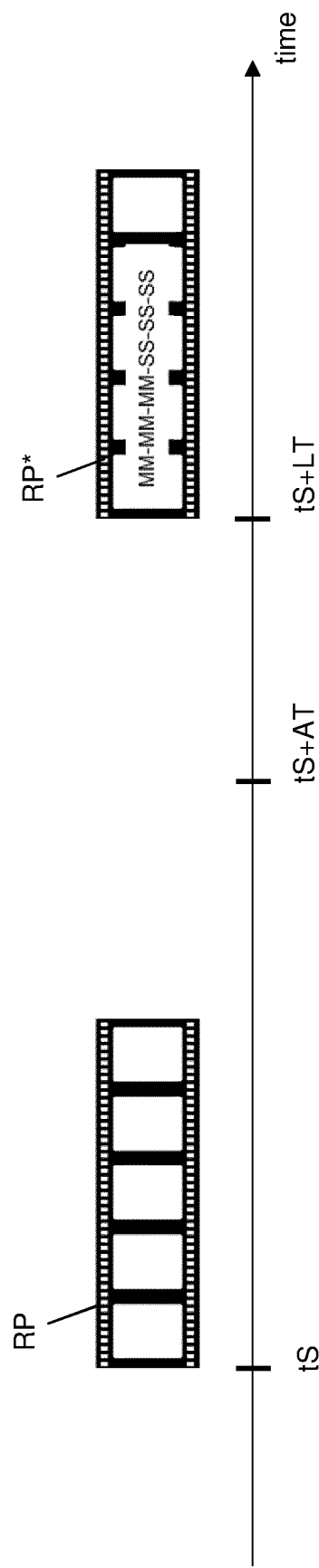

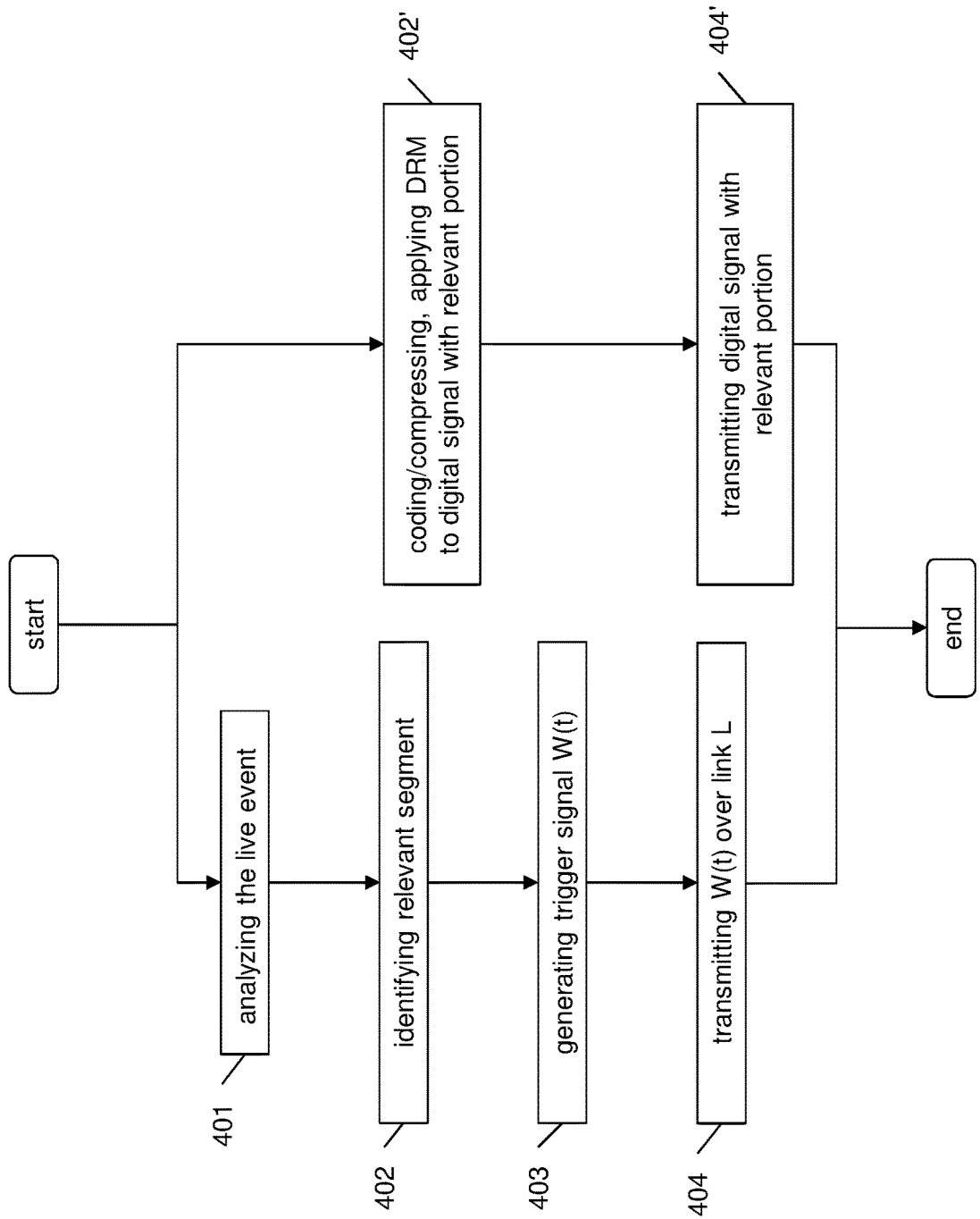

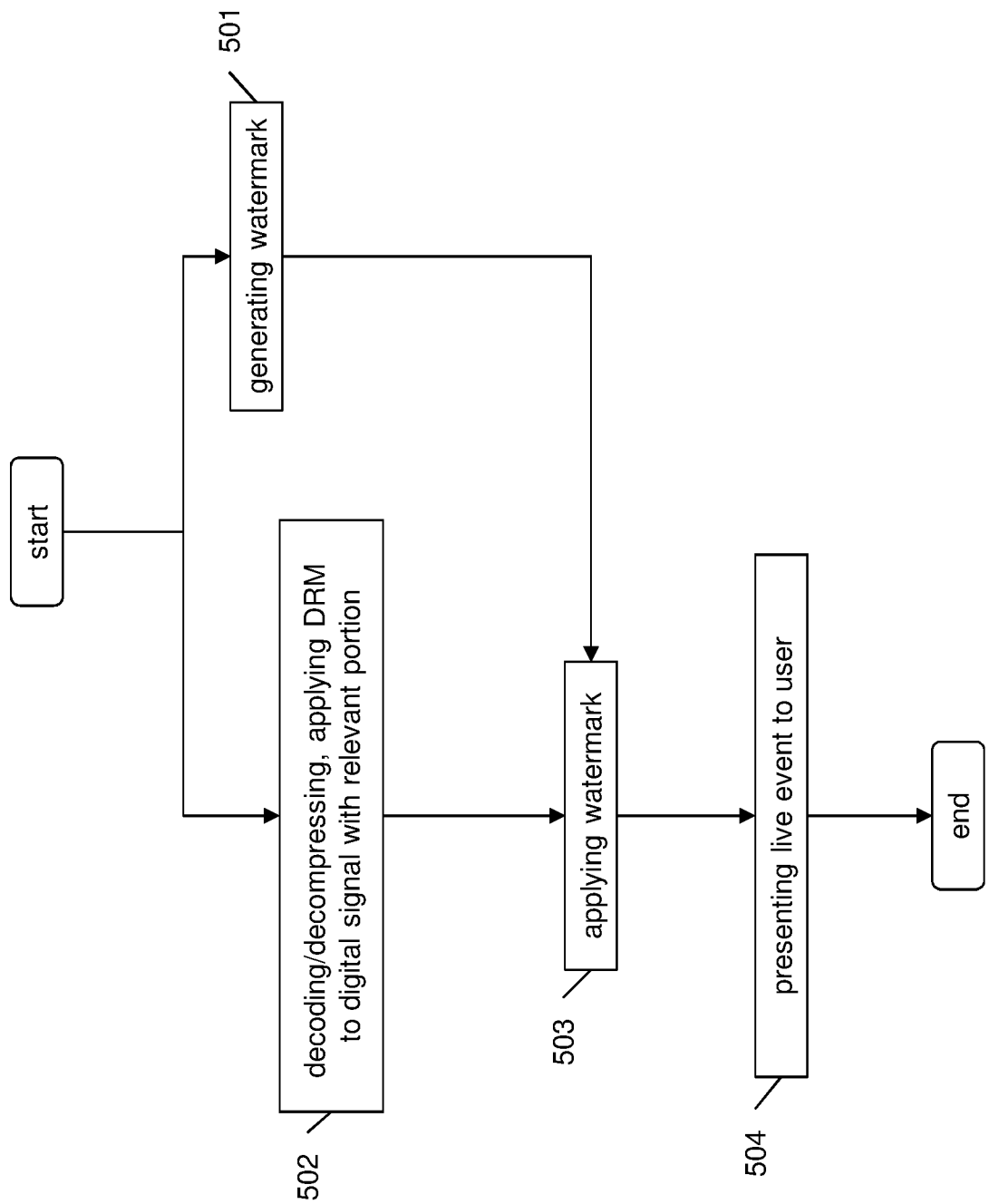

MULTIMEDIA CONTENT PROTECTION

TECHNICAL FIELD

The present invention relates to the field of telecommunications. In particular, the present invention relates to a method for protecting a multimedia content distributed by a content service (i.e. a service providing access to multimedia contents) from unauthorised redistribution.

BACKGROUND ART

The mass diffusion of content services for user entertainment is nowadays made possible by the growing development of, on the one side, digital broadcast distribution systems such as satellite systems (e.g. based on Digital Video Broadcasting—Satellite or DVB-S standard), digital terrestrial systems (e.g. based on Digital Video Broadcasting—Terrestrial or DVB-T standard), radio systems (e.g. based on the Digital Audio Broadcasting standard also known as DAB/DAB+), and, on the other side, digital unicast or multicast distribution systems based on broadband networks (the so-called "Over-The-Top" or OTT systems).

Within the context recalled above, the problem of an effective and efficient protection of contents arises. As a matter of fact, piracy has become a critical issue for the content industry, as a large percentage of multimedia content users seem to be consuming—via downloading or streaming—illegal content. According to recent investigations (https://fapav.it/wp-content/uploads/2019/07/SINTESI-INDAGINE-2018 FAPAV-Ipsos.pdf) in Italy, 38% of Italian adults committed at least one act of piracy by illicitly consuming films, series or programs, often pirating more than one type of content. A world overview shows varied but significant trends (https://ustr.gov/sites/default/files/files/Press/Reports/2018%20Special%20301.pdf).

The protection systems adopted today for digital broadcast distribution systems typically rely on encryption of the digital signal carrying the multimedia contents. These systems are then generally based on smart cards with decryption capabilities, such smart cards being used by being inserted in set-top boxes or television (TV) decoders or in appropriate slots made available in compatible television sets (namely, TV sets integrating the necessary capabilities for receiving and decoding the digital signal carrying the multimedia content provided through the digital broadcast distribution system), for example slots provided in a conditional access module (CAM) integrated in the TV set, implementing a conditional access system (CAS) standard. For unicast or multicast systems, protection systems are typically based on Digital Rights Management (DRM) technologies that are implemented as HW/SW modules and may be integrated within set-top boxes and TV sets, especially in case of services based on audio/video streaming technologies over broadband networks.

Technologies based on DRM make it possible to manage the distribution of multimedia contents to the authorized user devices, such as for example TV sets, according to the rights associated with the contents themselves, and to avoid unauthorized copies. Such rights may include limitations about the type of platform to be used, for example rights for the content distribution via the Internet only, or territorial limitations, such as rights for the sole distribution on mobile devices within a certain geographical area. Other rights may provide limitations about the size of the display of the user device (e.g. rights allowing to access the content on a display up to 10" in size, which are commonly defined as "mobile only" rights), or limitations about the quality (e.g. rights allowing to access HD contents but not 4K contents depending on the type of subscription purchased by the user). Other rights may be associated with the purchase of individual multimedia contents to allow to enjoy them for a limited (e.g. 48 hours) or unlimited period of time, or they may be associated with the purchase of subscriptions with recursive payment for a time limited access to a catalogue including a number of contents, etc.

It is known that, even when the multimedia contents are protected by DRM, they can still be copied after their first playback, for example through their acquisition with video recording systems and their real time or subsequent redistribution in an unauthorized manner. Furthermore, the content copy operation can introduce a more or less perceptible degradation of quality in the subsequent use of the contents themselves, which also depends on the quality of the original content, on the quality of the display used for playback and on the type of equipment and setup used for the acquisition.

Multimedia contents that are more valuable and therefore susceptible to this process are "live" contents, i.e. contents that are distributed concurrently with the event, with no substantial delay or with a (limited) delay that is substantially smaller than the event's expected duration, such as for example sport events (e.g. a live soccer match). These multimedia contents have a higher value when the (unauthorised) availability of the content is closer to the real time of the event. In such cases, redistribution may take place in real time or near real time during the event by duplicating the content and transferring it to digital distribution platforms accessible by the public via the Internet or equivalent systems.

Currently, to further protect contents against a possible unlawful redistribution, digital "watermarking" systems may be adopted, which provide for inserting a digital watermark inside a multimedia content, so to make it easier to track the source of illegal distribution and take appropriate actions including inhibiting the device used for playing the content.

WO 2008/000894 A1 discloses a method that comprises extracting selected portions of data from a stream of an original digital media object and then mass distributing the remaining incomplete media object. The extracted portions are watermarked and then transmitted separately via a bidirectional communication channel to a user terminal. The terminal then inserts the watermarked portions into their original positions in the incomplete media object so reproducing the original digital media object.

SUMMARY OF THE INVENTION

The inventor noticed that typically the digital watermark allows identifying, for the purpose of a forensic use against the unauthorized distribution of the multimedia content and possibly inhibiting the source of such unauthorized distribution, the content service and the user device from which the unauthorized copy has originated. However, traditionally, the digital watermarking is applied randomly in time to the multimedia content. In case of a live event, the digital watermarking is applied irrespectively of the significance of the actual instant content of the event itself. This means that the digital watermarking as traditionally applied does not allow to protect selected portions of the multimedia content having a limited duration, corresponding to significant (i.e. more valuable) segments of a live event. These significant segments may comprise the goals in a soccer match, and might have typically a duration of at most few minutes while the entire match is typically 90 minutes. Another example is a live event covering a marathon run, wherein a significant segment may be identified in the arrival of the top athletes. Significant segments of live events comprising the highlights have typically a great value for those who wants to illicitly redistribute the live event, e.g. the soccer match, or valuable content segments thereof. For instance, those segments of a soccer match have a high value for a service alerting soccer fans of a goal and then shortly after distributing the goal video clip.

Furthermore, the method described in WO 2008/000894 A1 is not suitable to protect a multimedia content related to a live event such as a soccer match, since extracting portions of the content, transmitting them separately from the rest of the multimedia content and finally inserting the portions into their original positions require processing times that are not compatible with the low latency usually required for a live event distribution. Moreover, the method is not robust with respect to possible failures of the link that is used to transmit the extracted portions. Indeed, in case of interruption or malfunction of this link, it would not be possible to recover the multimedia content and portions of the live event may be lost.

In the light of the above, the Applicant has tackled the problem of providing a method for protecting a multimedia content distributed by a content service, which overcomes at least one of the aforesaid drawbacks. In particular, the Applicant has tackled the problem of providing a method for protecting a multimedia content distributed by a content service, which allows protecting a multimedia content related to a live event in a more efficient manner, in particular which allows improving protection of selected portions of the multimedia content related with significant segments of the live event.

The inventor noticed that distribution systems based on broadband networks, such as those comprising transmission channels based on ADSL (Asymmetric Digital Subscriber Line) connections and/or optical fibres with adaptive streaming, employ video coding systems that, with respect to live events, introduce a certain amount of latency. This latency is primarily caused by the image encoding/decoding operations and by the distribution technology used (e.g. for streaming technologies, this latency ranges from seconds to some tens of seconds, depending on the particular technology, with typical values, in today's commercial services, around 15-45 seconds and around a few seconds in more advanced low latency systems). In these conditions, the images of live events as seen by the service customers are delayed with respect to real time by a time interval corresponding to the end-to-end latency of the distribution system. To maintain a stable audio/video stream and an efficient use of bandwidth on both fixed and mobile transmission networks, this latency can hardly be reduced below the values mentioned above.

The inventor has therefore noticed that the latency introduced by the distribution system can be exploited to improve the protection of the multimedia content related to a live event, in particular it can be exploited to efficiently protect selected portions of the multimedia content (i.e. portions corresponding to significant segments of the live events). Within such latency time segment even in low latency systems, having for example a latency of the order of magnitude of seconds, a standard live sport event transmitted for example at 25 or 60 frames/second includes several tens of frames. According to embodiments of the present invention, the significant segments of the live event can be identified automatically.

Notwithstanding the above reference to distribution systems based on broadband networks, it is to be noticed that the method according to the present invention can be applied also to other types of distribution systems, such as, e.g., radio broadcast distribution systems.

In the present description and in the claims, the expression "significant segment of a live event" will indicate a significant interval of the live event, which can be associated with a salient action or moment or with a salient concatenation of actions or moments occurring during the live event (e.g. a goal during a soccer match, the arrival of the winner during a marathon, a match point during a tennis game, an overtaking action during a motorcycle race).

Moreover, in the present description and in the claims, the expression "multimedia content" indicates digital data comprising one or more different types of data such as video, audio, image, text. A multimedia content may indicate either a streaming audio/video content such as a broadcast live television program or event, or an on-demand content such as a movie or a TV show or a bundle of episodes of a TV series or the like. Within the meaning of the present invention, the expression "multimedia content" will also relate to the contents transmitted over a television channels or a bundle of television channels. Furthermore, the expression multimedia content may also relate to an Internet web page or an interactive video game.

According to the present invention, a significant segment of a live event corresponds to a selected portion of the related multimedia content. A multimedia content comprising video data usually comprises a sequence of video frames. In this case, a significant segment of the live event corresponds to a selected portion comprising a sub-sequence of video frames of the multimedia content related to the live event, and the "beginning of the segment" is thus associated with the first frame of such sub-sequence of video frames.

Television broadcast channels are typically distributed by television platforms that may be based on fixed or mobile broadband networks, such as digital terrestrial-based television platforms or satellite-based television platforms. In Italy for example, satellite-based television platforms, such as Sky™, and digital terrestrial-based television platforms, such as Mediaset Premium™, typically provide subscription-based services. These television platforms may provide both live television channels and events and video-on-demand (VOD) contents, and the user can select to purchase either single events, according to, for instance, pay-per-view services, or subscriptions to bundle of channels or VOD contents.

Other services providing VOD contents, such as Now TV™, Netflix™, Amazon Prime Video™, DAZN™, Apple TV™, TIMvision™ typically use either a subscription model that requires users to pay a daily, weekly, monthly, or yearly fee to access a set of contents, which may comprise, typically, movies, live sports and TV shows or series, or a pay-per-view model to access a single event.

Furthermore, streaming platforms, such as Vimeo™, RaiPlay™ MediasetPlay™ are providing services based on live streaming and/or streaming on-demand of multimedia contents through the Internet.

According to a first aspect, the present invention provides a method for protecting a multimedia content distributed by a content service to a user device, the multimedia content being related to a live event, wherein the method comprises, during the live event:

a) identifying a significant segment of the live event;
b) generating a trigger signal associated with the significant segment;
c) at the user device, on the basis of the trigger signal, generating a marking comprising information identifying the user device; and
d) at the user device, applying the marking to a selected portion of the multimedia content, the selected portion corresponding to the significant segment of the live event.

In particular, preferably, the marking comprises a watermark.

Preferably, identifying a significant segment of the live event is performed with a first delay, AT, with respect to a start time, tS, of the significant segment of the live event, wherein the first delay, AT, is lower than a latency, LT, the latency being indicative of a second delay after which the selected portion is available to be presented to the user with respect to the start time, tS, of the significant segment.

Preferably, generating a trigger signal comprises, upon the identification of the significant segment, automatically generating a timing signal indicative of the time at which the significant segment is identified, and generating the trigger signal is based on the timing signal.

In addition or in alternative, generating a trigger signal comprises providing a timing signal indicative of the time at which the significant segment is identified, the timing signal resulting from a manual identification of the significant segment of the live event, and generating the trigger signal is based on the timing signal.

According to an embodiment of the present invention, the trigger signal, W(t), is an ON/OFF signal, wherein the trigger signal, W(t), is switched to an ON state at the time at which the significant segment is identified.

According to advantageous embodiments of the present invention, the trigger signal, W(t), contains information indicating one or more areas of a display of the user device at which the watermark has to be applied when the selected portion is shown on the display.

Optionally, the trigger signal, W(t), comprises a seed value adapted to be used at the user device to generate the marking.

Profitably, the method further comprises storing the trigger signal, W(t), in a database.

Preferably, the method further comprises sending to the user device the trigger signal over a communication link, the communication link being distinct with respect to a further communication link over which the multimedia content is sent to the user device. Preferably, the communication link is a protected communication link.

According to embodiments of the present invention, the method further comprises checking an availability and/or integrity of the communication link. Preferably, checking comprises repeatedly sending over the communication link a control signal, the control signal being a keep-alive or heartbeat signal.

Preferably, the method further comprises, on the basis of an outcome of the checking, operating the user device to stop providing the multimedia content.

Preferably, the marking comprises at least one identification parameter of the user device and/or localization data detected by the user device. In particular, preferably, the at least one identification parameter of the user device comprise an international mobile equipment identity of the user device and/or an international mobile station identity of the user device and/or a media access control address of the user device.

According to a second aspect, the present invention provides a system for controlling protection of a multimedia content distributed by a content service to a user device, the multimedia content being related to a live event, the system comprising:
  a detection unit configured to identify a significant segment of the live event; and
  a trigger unit configured to generate a trigger signal associated with the significant segment and to send the trigger signal to the user device, the trigger signal being configured to trigger the application of a marking over a selected portion of the multimedia content at the user device, the selected portion corresponding to the significant segment of the live event.

According to a third aspect, the present invention provides a user device configured to receive a multimedia content distributed by a content service, the multimedia content being related to a live event, the user device comprising:
  a marking generation unit configured to receive a trigger signal associated with a significant segment of the live event and, on the basis of the trigger signal, to generate a marking comprising information identifying the user device; and
  a marking application unit configured to apply the marking to a selected portion of the multimedia content, the selected portion corresponding to the significant segment of the live event.

BRIEF DESCRIPTION OF THE DRAWINGS

The present invention will become clearer from the following detailed description, given by way of example and not of limitation, to be read with reference to the accompanying drawings, wherein:

FIG. 1 schematically illustrates an exemplary scenario of application of the method according to the present invention;

FIG. 2 schematically illustrates a trigger signal according to an embodiment of the present invention;

FIG. 3 is a timeline illustrating steps of the method of the present invention;

FIG. 4 is a flowchart illustrating steps of the method according to the present invention; and FIG. 5 is a flowchart illustrating other steps of the method according to the present invention.

DETAILED DESCRIPTION OF PREFERRED EMBODIMENTS OF THE INVENTION

FIG. 1 schematically illustrates an exemplary scenario of application of the method of the present invention. In this exemplary scenario, a user obtains a subscription to a content service. The content service is distributing to the user a multimedia content related to a live event. The multimedia content comprises audio and video contents acquired by an audio/video acquisition system. For sake of non limiting example, reference will be mainly made to a soccer match, whose related multimedia content comprises the images (in particular, a sequence of video frames) and the audio of the soccer match. The live event and its acquisition are schematically represented in FIG. 1 with a soccer ball.

According to the scheme of FIG. 1, the multimedia content is distributed by the content service provider through a distribution system 1 to a user device 2. The distribution system 1 may comprise, e.g., a digital terrestrial-based television platform or a live streaming platform or a multicasting platform.

The user device 2 is a device allowing the multimedia content consumption by a user. Within the meaning of the present invention, in particular, the user device 2 is a device comprising hardware and software modules configured to receive and process the digital signal carrying the multimedia content, as it will be better described herein after.

The user device 2 is also configured to provide an output signal to an image display and sound reproduction appliance, such as a TV set, so that the digital signal is turned into the multimedia content in a form that can be displayed on a screen of the appliance. The user device 2 may be either an apparatus separated from the TV set and connectable to it, such as a digital set-top box (STB) or TV decoder. Alternatively, the user device may be the TV set, in this case incorporating the capabilities of receiving and processing the digital signal carrying the multimedia content. According to other embodiments, the user device may be a personal computer (PC) or laptop or tablet or the like, possibly incorporating (or being connectable to) a monitor and/or a loudspeaker allowing the user to enjoy the multimedia content. According to further embodiments, the user device 2 may be a mobile device such as a smartphone, connected to a mobile or fixed communication network.

FIG. 1 also schematically shows a system 3 for controlling protection of the multimedia content against unauthorised redistribution indicated as protection control system according to the present invention. This system may be implemented at a server of the content service provider or its functions may be distributed between the service provider and the device 2. As it will be clear herein after, the protection control system 3 is configured to generate a trigger signal for the user device 2 to trigger the generation of a marking, in particular, preferably, a watermark, to be dynamically applied to the multimedia content. For sake of non limiting example, the following description will make reference to a watermark as the marking applied to the multimedia content according to embodiments of the present invention.

The distribution system 1 preferably comprises a media transmission unit 11 configured to process the multimedia content related to the live event, generate a corresponding digital signal and transmit the digital signal carrying the multimedia content over a communication network 12 towards the user device 2. The media transmission unit 11 may be implemented as a combination of hardware and/or software modules at a server of the content service provider, which may be different from the server at which the protection enabling system is implemented. The hardware and/or software modules of the media transmission unit 11 implement functions and operations that are known to a person skilled in the art of television or streaming platforms. Hence, the media transmission unit 11 will not be described in detail. It preferably comprises components configured to implement coding and/or compression algorithms to the multimedia content, to implement streaming related functions and to apply, for instance, a DRM technology. For instance, the media transmission unit 11 may be configured to apply an encryption scheme to the multimedia content prior to transmission.

At the output of the media transmission unit 11, the digital signal carrying the multimedia content related to the live event is suitable for being transmitted through the communication network 12. The communication network 12 may be a wired communication network comprising a number of nodes with links to the user premises that can be, for instance, ADSL links and/or optical fibre links. According to other embodiments, the communication network 12 may be a wireless communication network, such as a mobile communication network. The communication network 12 may comprise a Content Delivery Network (CDN).

The user device 2 preferably comprises a media reception unit 21 configured to receive, from the communication network 12, the digital signal carrying the multimedia content related to the live event and process it. The media reception unit 21 may be implemented as a combination of hardware and/or software modules. The hardware and/or software modules of the media reception unit 21 implement functions and operations that are known to a person skilled in the art of television or streaming platforms. Hence, the media reception unit 21 will not be described in detail. It preferably comprises components configured to implement decoding and/or decompression algorithms to the received digital signal and to apply, for instance, the considered DRM technology. For instance, the media reception unit 21 may be configured to decrypt the digital signal to recover the multimedia content by using a decryption key as part of the specific DRM system that is applied. At the output of the media reception unit 21, the multimedia content is available to be presented to the user. It is to be noticed that typically, the multimedia content is available to be presented to the user at the user device 2 after a given delay with respect to the real time of the related live event. Typically, a latency LT (also referred to as "end-to-end latency") is introduced by the distribution system between the input of the media transmission unit 11 and the output of the media reception unit 21, which may range from a few seconds to tens of seconds.

According to the present invention, the protection control system 3 comprises a detection unit 33 and a trigger unit 34 connected in cascade. Both units may be implemented as a combination of hardware and/or software modules implementing specific functions at a server of the content service provider.

The detection unit 33 is preferably configured to gather and/or generate descriptive data related to the live event, to analyse the descriptive data and to identify significant segments of the live event based on such descriptive data. Identifying a significant segment preferably comprises identifying, with a given amount of delay with respect to the real time of the live event, a time at which the significant segment starts and a time at which the significant segment ends. In the following description and in the claims, the expression "a time at which the significant segment is identified" will indicate the time at which said identification starts. The trigger unit 34 is then configured to generate a trigger signal for the user device 2, the trigger signal being configured to trigger the application of a watermark over the multimedia content related to the live event, in particular over selected time and space portions of the multimedia content corresponding to the identified significant segments.

The descriptive data may comprise data that are gathered by the detection unit 33 from one or more external data sources (e.g. external service providers which operate live event tracking systems), which provide these data in real time with respect to the live event. Descriptive data gathered from external data sources tracking a soccer match comprise, for instance, real time tracking of players and statistics related to the soccer match.

Furthermore, the descriptive data may comprise data that are generated by the detection unit 33 on the basis of a real time analysis of the considered event. Such data can also be generated for example by optical based tracking systems currently used in popular sports including soccer, basketball, baseball etc. such as the SportsVU™ system. For instance, descriptive data generated by the detection unit 33 as related to a soccer match may comprise different sub-sets of data, one sub-set containing data that describe actions related to one soccer team and another sub-set containing data that describe actions related to the other soccer team. For instance, for a soccer team, the following data can be considered: absolute positions of the players, relative positions and speed of the players, position and speed of the ball, distance run by the players, number of goals, number of goal assists, players' substitutions, ball possession, number of penalties conceded, number of offsides, number of shots, number of red cards, number of yellow cards, etc. According to another example, descriptive data that may be generated by the detection unit 33 as related to a Formula 1 (F1) race may comprise telemetry data such as the absolute position of a car in the track, the speed of the car and the distance and relative speed between two or more cars, estimated number of laps to refuelling, etc.

Furthermore, the descriptive data may also comprise data that are indicative of longer-term statistics and analyses. For instance, descriptive data of this type as related to a soccer match may comprise statistics indicative of a player's behaviour during the entire season or over the last seasons, such as, for example, the number of appearances of the player, the number of games played, the number of goals, the number of successful passes, etc. Other data may indicate statistics related to the team over the current season and/or over the last seasons, such as, for example, the number of games played, the total shots, the shooting accuracy, etc. Data indicative of longer-term statistics and analyses may be used by the detection unit 33 to enhance the accuracy of the significant segment's identification. For instance, the longer-term statistics about one soccer player may be used to weight real-time data to identify a significant segment with improved reliability. These data may be generated by the detection unit 33 by processing historical data available at the detection unit 33 and/or gathered from external sources to improve data diversity.

The detection unit 33 is further configured to optionally aggregate descriptive data provided by (possibly different) external data sources and descriptive data generated by the detection unit 33. For example, external data can be obtained by different real-time tracking systems or service providers; as an example, F1 car telemetry can be gathered from different telemetry systems complementing each other.

The detection unit 33 is further configured to process in real time the descriptive data and to automatically identify significant segments of the live event on the basis of an outcome of said processing of the descriptive data. For example, in case of a soccer match, the start of a significant segment could be identified when the descriptive data tracking the game in real-time show that a player is moving at fast speed, she/he is located beyond a certain distance from other players and she/he is moving close to the goalkeeper area pointing at a probable goal shoot attempt. Also, the time at which the significant segment ends can be automatically identified (for instance, in the soccer match, the game is suspended at the end of the significant action or because the game interval begins). In another example related to F1 racing, the start of a significant segment may be identified when, for a F1 car, the descriptive data indicative of the distance of the car from the preceding car indicates a fast approaching action in a section of the track where the probability of an overtake is high based on current and historical racing data.

In the following lines, it will be described an exemplary processing performed by the detection unit 33 to identify a significant segment of a soccer match between team A and team B.

The exemplary processing is based on the following first set of parameters:

```
<AttackArea>
<MinCatchDistance>
<MinShootingSuccessRate>
``` wherein <AttackArea> corresponds to an area associated with attack actions (e.g. the penalty area), <MinCatchDistance> corresponds to a distance threshold indicating a minimum distance within which there is a high probability that a player (e.g. a striker) is intercepted by another player (e.g. a defender), and <MinShootingSuccessRate> corresponds to a threshold indicating a minimum percentage of successful shots.

The values of the parameters of this first set are independent of the player and are defined based on long-term statistics across a number of soccer matches.

Moreover, a second set of parameters is considered, as follows:

```
<MinAttackSpeed> of <player>
<AverageShooting Success> of <player>
``` wherein the parameters of this second set are associated with each player of teams A and B and are based on individual statistics. A set of values is determined for each player. <MinAttackSpeed> corresponds to a minimum speed of the player when involved in an attack action, and <AverageShooting Success> corresponds to a percentage of successful shots of the player.

This exemplary processing executes the following functions:

```
identify <player> with ball possession
for <player>
    calculate <PlayerPosition>
    calculate <PlayerSpeed>
    calculate <PlayerRelativeDistance> from <all players
    except goalkeeper>
if <PlayerPosition> is within <AttackArea> then
    if <PlayerSpeed> is higher than <MinAttackSpeed> of
    <player> then
        if <PlayerRelativedDistance> of <player> is higher than
        <MinCatchDistance> then
            if <AverageShooting Success> of <player> is higher than
            <MinShootingSuccessRate> then
                trigger start of significant segment identification
```

According to the above, the exemplary processing comprises a function identifying the player which is in possession of the ball, and then one or more functions calculating, for the player in possession of the ball, her/his position in the field, her/his speed and her/his relative distance with respect to the other players in the field. At this point, four checks are performed in order to verify whether: a) the player position is within the area of attack b) the speed of the player is higher than the minimum speed of the player when involved in an attack action, c) the relative distance of the player from all the other players is higher than the minimum distance within which there is a high probability that a player is intercepted, and d) the percentage of successful shots of the player is higher than a minimum percentage of successful shots. If all these checks provide affirmative results, the start of a significant segment is identified. It has also to be noted that depending on the frame rate of the event being transmitted and on the time resolution of available event descriptive parameters, the above function can be calculated with a time resolution up to such frame rate or resolution, for example up to 25 times/second.

The detection unit 33 may employ a number of techniques including AI (Artificial Intelligence) based algorithms to automatically identify the significant segments. AI-based algorithms may include pattern recognition algorithms and/or predictive models. Pattern recognition algorithms may be applied to a soccer match to recognize significant actions such as a goal. Indeed, in this case, the environment is always nearly the same (the soccer field) while actions change. Predictive models may be applied to a F1 race to estimate, for instance, a possible overtaking action. Indeed, the circuit changes from race to race but an overtaking action may be predicted on the basis of, for instance, telemetry data, which, in case of an overtaking, may show specific trends.

For instance, the detection unit 33 may identify a significant segment of a soccer match by using a machine learning algorithm and in particular on Convolutional Neural Networks (CNNs). In this case:

a) a CNN is specifically trained via a set of soccer highlight video clips and descriptive real time and historical soccer data with the objective of identifying, with a target high accuracy, game actions indicating the beginning of a significant segment;

b) the CNN is then fed with live soccer video clips, real time descriptive data and historical data on the match being played;

c) when data indicate the occurrence of one of the game actions that the CNN has been trained to recognize, the CNN produces an output indicating the beginning of a significant segment.

Advantageously, by properly using the descriptive real time data and historical data, the CNN can be activated also based on specified conditions (for example, the training set of data may be construed by excluding time frames when player speed is low).

According to the present invention, if the significant segment of the live event starts at time tS (in real time), the time at which this is identified by the detection unit 33 is tS+ΔT, where ΔT is a delay. The delay ΔT depends on the processing times of the detection unit 33 and also on the video frame rate used in the audio/video acquisition system. The detection unit 33 may be configured to operate at a video frame rate higher than the video frame rate of the audio/video acquisition system, to reduce the delay ΔT.

The detection unit 33 is further configured to generate, at its output, a timing signal indicative of the time tS+ΔT at which the significant segment of the live event is identified. In particular, the timing signal is preferably indicative of a time at which the significant segment starts and of a time at which the significant segment ends.

The trigger unit 34 is configured to receive the timing signal from the detection unit 33 substantially at time tS+ΔT and to generate a corresponding trigger signal W(t) for the user device 2. The trigger signal W(t) is preferably an ON/OFF signal associated with the identified significant segment of the live event. In particular, according to an embodiment of the present invention, the trigger signal W(t) is switched to an ON state at the time at which the start of the significant segment is identified and is further switched to an OFF state at the time at which the significant segment ends. In other words, the trigger signal W(t) contains information allowing the user device 2 to generate and apply a watermark to the selected portion of the multimedia content corresponding to the significant segment, as it will be described herein after. In particular, the trigger signal W(t) may contain information useful to improve synchronization such as an absolute time reference indicating an absolute time instant at which the significant segment begins (e.g. the absolute time of a goal since the beginning of the soccer match).

The trigger unit 34 is further configured to receive at its input, in alternative or in addition to the timing signal received from the detection unit 33, a further timing signal resulting from a manual identification of the significant segment of the live event. In case of a soccer match, for instance, the manual identification may be performed by a member of an editorial staff of the service provider, who is following the soccer match and manually indicates the occurrence of a significant segment at a given time. For example, the manual identification may be used to identify unusual events or events not directly related to a game action, such as unexpected heavy rain, etc. In such case, the trigger unit 34 may generate the trigger signal W(t) by processing the timing signal received by the detection unit 33 and/or the further timing signal resulting from the manual identification of the significant segment of the live event.

According to an advantageous embodiment of the present invention, for a multimedia content comprising a video content, the trigger signal W(t) generated by the trigger unit 34 may contain information indicating one or more areas, identified by unit 34 based on descriptive data received by unit 33, of a display of the user device 2 at which the watermark has to be applied when the selected portion of the multimedia content is shown on said display. This information will be referred to in the following description also as watermark positioning information. For instance, if the display is subdivided into four quadrants, this information may indicate the upper left quadrant, the upper right quadrant, the lower left quadrant or the lower right quadrant, or any combination thereof. A different number of areas of the display may be analogously considered by further subdividing one or more areas of the display into a number of sub-areas (e.g. 16, if each one of the above quadrants is further subdivided by four).

According to these embodiments, hence, the trigger signal W(t) comprises an information indicating when the watermark is to be applied (i.e. the ON state of the trigger signal) to the selected portion of the multimedia content and an information indicating where the watermark is to be applied (i.e. at the areas or sub areas of the display).

The selection of the one or more areas of the display at which to apply the watermark may be dynamic, in the sense that it may vary from segment to segment (and also during a single segment) and it may depend on the type of live event being covered. According to an embodiment of the present invention, the trigger signal W(t) associated with a significant segment preferably comprises a corresponding watermark positioning information indicating one or more selected areas of the display (for instance, the upper left quadrant) at which the watermark has to be applied for the entire duration of the considered significant segment. In this case, the selected area(s) at which to apply the watermark do not vary over the time duration of the significant segment and may be different when considering different significant segments of the same live event. According to other embodiments of the present invention, the trigger signal W(t) associated with a significant segment may comprise a time-varying watermark positioning information indicating one or more selected areas of the display at which the watermark has to be applied for the duration of the considered significant segment. In this case, in particular, the selected area(s) may vary during the considered significant segment: for instance, assuming that the significant segment is 20 seconds long, the selected area(s) may comprise a single area of the display (e.g. the upper left quadrant) for the first 5 seconds, then two areas may be considered for the subsequent 10 seconds (e.g. upper left quadrant and upper right quadrant) and finally it may be again a single area (e.g. the lower left quadrant) for the remaining 5 seconds. Advantageously, such a dynamic, time-varying, application of the watermark at different areas across the display may be performed when, for instance, a player in a soccer match moves on the field and across the display during the significant segment, to protect the most important parts of the displayed images. Moreover, it is also advantageous as it results in a robust watermarking process, whose reverse engineering becomes a very complex task.

Optionally, the trigger signal W(t) may also comprise a further time varying information, which will be indicated as "seed value s(t)", adapted to be used by the user device (2) to generate the watermark to be inserted in the selected portion of the multimedia content, as it will be described herein after. The seed value may be a randomly generated number.

FIG. 2 schematically shows a diagram for illustrating the content of the trigger signal W(t). FIG. 2 schematically shows a number of video frames of the selected portion of the multimedia content associated with the significant segment. The video frames are displayed on a display subdivided in four areas, labelled 1, 2, 3 and 4. The considered significant segment starts at time tS and ends at time t3, having a duration tD. A soccer ball schematically illustrates the progress of a salient action during the considered significant segment. In FIG. 2 it is also illustrated, for sake of example, the content of a corresponding trigger signal W(t). The reported values are for illustrative purpose only. As shown in FIG. 2, the trigger signal W(t) associated with the significant segment starting at time tS is preferably switched to an ON state at time tS+AT and comprises an information indicating one or more areas of the display on which the watermark has to be applied, and, optionally, the seed value. The information indicating the area(s) of the display on which the watermark has to be applied is represented, as a non-limiting example, as an array of binary values, whose dimension equals the number of areas of the display, where each value is associated with a respective area of the display. Each binary value may be set to 1 when to indicate a selected area. The trigger signal shown in FIG. 2 indicates that:

- within the time interval t1-tS after start, the watermark is to be applied at areas 2 and 4 of the display, and the seed value is s(tS);
- for the video frames comprised in the time interval t2-t1, the watermark is to be applied at area 2 only, and the seed value is s(t1);
- within the time interval t3-t2, the watermark is to be applied at areas 3 and 4, and the seed value is s(t2); and that
- when the significant segment ends, the watermark is not to be applied anymore.

The seed values s(tS), s(t1) and s(t2) may be randomly generated numbers.

According to embodiments of the present invention, the trigger signal W(t) is stored in a database DB. The database DB may be part of the protection control system 3 (in FIG. 1, for sake of example, the database DB is represented as connected to the trigger unit 34) and managed by the service provider.

It is to be noted that by inserting a watermark only in selected portions of a multimedia content related to a live event, such portions being selected dynamically according to the present invention, these selected portions of the content (which correspond to the most valuable segments of the live event) are protected and, at the same time, reverse engineering becomes more complex. Therefore, attacking the protection to make unauthorised and untraceable copies of the considered portions of the multimedia content becomes more difficult. The selected portions of the content are the most likely to be redistributed on illegal channels and therefore are those on which protection is going to be more effective.

According to the present invention, the trigger signal W(t) is preferably sent by the trigger unit 34 to the user device 2 substantially at time tS+AT over a communication link L. The communication link L used by the protection control system 3 to send the trigger signal W(t) is preferably a protected communication link connecting the protection control system 3 to the user device 2 and is preferably distinct with respect to the link used by the distribution system to send the digital signal carrying the multimedia content to the user device 2. By "distinct" it is meant that the link L follows an at least partly distinct physical path, or that the link L is logically distinct, i.e., different according to at least a telecommunication protocol from the link used by the distribution system to send the digital signal carrying the multimedia content to the user device 2. In this way, advantageously, the trigger signal W(t) is transmitted to the user device 2 in a reliable manner which reduces the risk that the trigger signal is illicitly detected by making such detection more difficult.

According to the present invention, the user device 2 also comprises a connection checking unit 22, connected to the media reception unit 21. The connection checking unit 22 may be implemented as a combination of hardware and/or software modules implementing specific functions. In particular, the connection checking unit 22 is configured to implement a function for checking the availability and/or the integrity of the communication link L over which the distribution system is sending the trigger signal W (t). This check may be performed, for instance, by establishing a protected connection over the communication link L over which a control signal such as a "keep-alive" or "heartbeat" signal is repeatedly sent irrespective on the W(t) trigger signal being transmitted. The control signal may be sent by the connection checking unit 22 at predefined intervals, for instance, 50 times per second, for a video frame rate equal to 25 frames/sec. If the connection checking unit 22 does not receive any reply, it can assume that the communication link L is malfunctioning or that the communication link L is down and take appropriate actions. Since the control signal is sent at a rate which is higher than the video frame rate, it is possible to check the communication link L, and possibly take actions, with a time resolution up to a single video frame.

Moreover, the connection checking unit 22 is configured to receive the timing signal provided by the detection unit 33. Indeed, as the presence of the trigger signal W(t) over the communication link L is unpredictable, the absence of such signal may be tied to an unavailability of the communication channel L which may be caused by a fraudulent behaviour or by a random disconnection. The availability of the timing signal at the connection checking unit 22 may thus advantageously provide a further means for checking the reliability of the communication channel L.

According to preferred embodiments of the present invention, the connection checking unit 22 is further configured to, in case the communication link L is subject to a permanent failure or to a performance degradation (e.g. the link L is interrupted for a significantly long period of time), generate a command signal and send the command signal to the media reception unit 21 to stop processing the digital signal carrying the multimedia content related to the live event and hence to stop providing at its output the considered multimedia content. For short duration link interruptions, the system may instead continue playing the multimedia content, according to specific configurations and rules defined by the service provider.

The user device 2 further preferably comprises a marking generation unit 23 and a marking application unit 24 connected in cascade. Both units may be implemented as a combination of hardware and/or software modules implementing specific functions. The marking generation unit 23 is configured to receive the trigger signal W(t) sent by the protection control system over the communication link L and to implement a marking generation function for generating a watermark to be applied to the multimedia content. Functions for the generation and application of a watermark to a multimedia content, such as lossless information hiding techniques, are known and will not be described in detail herein after. The generation of the watermark is performed upon reception of the trigger signal W(t), which is available at the user device 2 substantially at time tS+AT. Indeed, the time of transmission of the trigger signal W(t) is orders of magnitude lower than time tS+AT.

The watermark generated by the marking generation unit 23 is specific for the user device 2. In particular, the watermark preferably contains a set of information associated with the user device 2 and with the content service. The information contained in the watermark preferably comprise one or more of: at least one identification parameter of the user device 2, localization data detected by the user device 2 and service related data. For example, the at least one identification parameter may include the IMEI (International Mobile Equipment Identity) and/or the IMSI (International Mobile Station Identity) of the user device 2, in case the user device 2 is a mobile device, and/or the MAC (Media Access Control) address of the user device 2. The service related data may comprise a unique token assigned to the user device by the service provider when the service is enabled on such user device.

Optionally, in addition, the marking generation unit 23 may also use the seed value s(t) that may be carried in the trigger signal W(t) to generate the watermark. In other words, the seed value carried by the trigger signal W(t) may be used as input by the marking generation function at the marking generation unit 23. In this way, advantageously, the generated watermark does not depend only on information locally available at the user device 2 but also on an information which needs to be received from the protection control system 3. This makes the method more robust against illicit manipulations of the user device, while keeping the implementation complexity low.

It is to be noticed that, according to other alternative embodiments, the marking generation unit 23 may recover an input value for the marking generation function from the watermark spatial positioning information comprised in the trigger signal W(t). Also in this case, advantageously, the generated watermark depends on an information that needs to be recovered from the trigger signal W(t) received from the protection control system 3, thus improving the robustness of the method.

The marking application unit 24 is preferably configured to receive the watermark from the marking generation unit 23 and to implement a marking application function for applying it to the selected portion of the multimedia content related to the live event, when the selected portion of the multimedia content becomes available to be presented to the user at the user device 2 (namely, at time tS+LT). Since the time AT required to generate the trigger signal W(t) is in general smaller than the latency LT, the trigger signal W(t) is available at the user device 2 before the selected portion of the multimedia content. Hence, the trigger signal W(t) can be used to trigger the generation of the watermark in time to apply the watermark to the selected portion of the multimedia content when, at time tS+LT, it becomes available at the user device 2. As already anticipated above, according to an embodiment of the present invention, the marking application function is activated when the state of the trigger signal W(t) is set to ON, and deactivated when state is OFF. Moreover, the marking application function may use the watermark positioning information carried in the trigger signal W(t) to apply the watermark to the selected portion at the one or more areas of the display indicated in such information.

FIG. 3 is a timeline that schematically illustrates the timing of the operations described above. Time tS is the time at which a significant segment of the live event starts. FIG. 3 shows the corresponding selected portion RP of the associated multimedia content streamed by the distribution system starting substantially at time tS. Time tS+AT is the time at which the beginning of the significant segment corresponding to this selected portion RP is identified by the detection unit 33 of the distribution system and substantially corresponds to the time at which the watermark is generated. Time tS+LT is the time at which the watermark is applied to the selected portion RP of the multimedia content when it is actually available to be presented to the user at the user device 2. In other words, the time tS+LT is the time at which the beginning of a watermarked selected portion RP* (i.e. the first video frame of the watermarked selected portion RP*) is presented to the user. In FIG. 3, the watermarked selected portion RP* of the multimedia content is the portion actually available to the user and corresponds to the selected portion RP to which the watermark has been applied. In FIG. 3, for sake of example, the watermark contains the identification parameter MM-MM-MM-SS-SS-SS (where MM-MM-MM is a representation of the prefix specific for each manufacturer and SS-SS-SS represent an identification number for the specific device), which is assumed to be the MAC address of the user device 2.

FIGS. 4 and 5 are flowcharts illustrating the method for protecting a multimedia content according to the present invention. In particular, FIG. 4 illustrates the operations performed by the distribution system 1 and the protection control system 3, while FIG. 5 illustrates the operations performed by the user device 2.

As already mentioned above, it is assumed that the content service is distributing to the user a multimedia content related to a live event.

During the live event, descriptive data are analysed by the detection unit 33 of the distribution system. In particular, at step 401, the detection unit 33 preferably processes in real time the descriptive data and automatically identifies, at step 402, the start of a significant segment of the live event on the basis of an outcome of said processing of the descriptive data. It is to be noticed that, each time the detection unit 33 automatically identifies the beginning of the significant segment, the end of the significant segment can be analogously automatically identified (for instance, in a soccer match, the end of the significant segment can be automatically identified when the game is suspended at the end of the significant action or because the game interval begins). According to the present invention, if the significant segment of the live event starts at time tS (in real time), it is identified by the detection unit 33 at time tS+AT. The detection unit 33 then generates, at its output, a timing signal indicative of the time tS+AT at which the significant segment of the live event is identified.

In the meantime, at step 402', the media transmission unit 11 of the distribution system 1 processes the selected portion RP of the multimedia content, which corresponds to the identified significant segment of the live event. In particular, the significant portion RP is coded/compressed and added to the stream of data associated with the multimedia content of the live event. The media transmission unit 11 may also apply a DRM technology. For instance, the media transmission unit 11 applies an encryption scheme to the multimedia content prior to transmission.

At step 403, the trigger unit 34 preferably receives the timing signal from the detection unit 33 and generates a corresponding trigger signal W(t) for the user device 2.

At step 404, the trigger signal W(t) is sent by the trigger unit 34 to the user device 2 over the communication link L. As already specified above, transmission of the trigger signal W(t) is preferably performed over a distinct link with respect to the link used for transmission to the user device 2 of the digital signal carrying the multimedia content, in particular the selected portion RP, which takes place from the media transmission unit 11 to the user device 2 over the communication network 12 (step 404').

With reference now to the flowchart of FIG. 5, at the user device 2, the marking generation unit 23 preferably receives the trigger signal W(t) from the trigger unit 34 of the protection control system over the communication link L (step 501). Then, the marking generation unit 23 preferably generates a watermark in correspondence of the time indicated by the trigger signal W(t), which substantially corresponds to the time tS+AT at which the selected portion has been identified.

In parallel, the media reception unit 21 is receiving the digital signal carrying the multimedia content, and in particular the selected portion RP (step 502). The media reception unit 21 preferably processes the digital signal by decoding/decompressing the multimedia content and applying, for instance, the considered DRM technology. For instance, the media reception unit 21 decrypts the digital signal to recover the multimedia content by using a decryption key. In particular, the media reception unit 21 preferably decodes/decompresses the selected portion RP from the stream of data associated with the multimedia content of the live event. It is to be noticed that the beginning of the selected portion RP (i.e. the first video frame) is available at the input of the marking application unit 24 at time tS+LT, where LT is the latency described above.

At step 503, the marking application unit 24 preferably applies the watermark to the selected portion RP. The watermarked selected portion RP* is then available to be presented to the user at the user device 2 (step 504).

It is to be noticed that, substantially in parallel with the operations described above, the connection checking unit 22 preferably checks the availability and the integrity of the communication link L over which the protection control system 3 is sending the trigger signal W(t). In case the communication link L is interrupted, in particular when the link L is interrupted for a significantly long period of time, the connection checking unit 22 may send to the media reception unit 21 of the user device 2 a command to stop processing the digital signal received from the media transmission unit 11 of the distribution system; as a consequence, providing the multimedia content at the output of the media reception unit 21 to the marking application unit 24 is interrupted.

According to the method of the present invention, the watermark is advantageously applied to the selected portion of the multimedia content because the time required to generate the trigger signal W(t) since the significant segment of the live event started, AT, is smaller than the end-to-end latency of the distribution system which makes the selected portion available for presentation to the user at the user device. This makes the method of the present invention extremely advantageous, since it allows to apply the watermark to the selected portions of the live event to be protected with a frequency that depends on what is happening during the considered live event, and which cannot be controlled or planned during an (unauthorized) redistribution of the event, especially if this redistribution must take place in a time very close to real time in order to preserve the value of the illegal distribution attempted.

However, the present invention can be applied even in case the time required to generate the trigger signal W(t) is not smaller than the end-to-end latency, which depends on the characteristics of the distribution system. In this case, a buffer may be provided between the media reception unit 21 and the marking application unit 24 to introduce a delay in the provision of the multimedia content which matches the delay AT, in order to guarantee that the watermark is timely applied to the selected portion of the multimedia content.

The method according to the present invention is also very robust, which allows to effectively protect the considered event from any unauthorized redistribution. In fact, to prevent the connection between the trigger unit of the distribution system and the user device from being interrupted, the method according to the present invention provides for a connection checking unit capable of detecting an interruption of the connection between the trigger unit and the user device and, as a consequence, sending a command to block the processing (typically comprising decoding/decompressing and decryption) of the data stream. The connection checking unit is also arranged to ensure that the connection between the trigger unit and the user device is maintained. Indeed, if necessary, this unit may try to restore the connection in the event of an interruption, so that the user device continues to receive the trigger signal which is necessary for the generation and application of the watermark. For example, in a scenario involving a mobile user device and a mobile communication network, restoring the connection may be achieved by regularly checking the mobile communication network signal and attempting to re-establish the connection when suitable conditions apply.

Advantageously, the trigger signals generated according to the present invention are stored in a database to be used to identify any unauthorized distribution of the multimedia contents both in real time and after their (authorized) distribution. This can be done by analysis systems (not shown in the drawings) operating during the live event or after the live event. An analysis system of this type is typically scanning the Internet to search and scan repositories providing illegal copies or to identify content services with servers where unauthorised copies of the multimedia content related to the live event have been uploaded. It is apparent that such an analysis system may use the information applied to watermark the live event to easily identify, even in real time during the live event, the device that has been used as the source of the illegal distribution, i.e. the device used to play the selected portions of the multimedia content before their illegal redistribution. The useful information comprises the selected portions themselves, the trigger signals and the marking generation functions that are active on the user devices used by the customers. Indeed, by knowing, even in real time, the portions of the multimedia content on which the watermark is applied and the portions of display on which it is inserted according to the trigger signal, the analysis system can examine the images and identify the watermark to recover the data comprised in the watermark itself, which, as mentioned above, may allow to identify the user device (and possibly the user) and its location. In other words, by knowing beforehand what portions of the live events have been watermarked, the analysis systems can more quickly identify the sources of illegal copies by detecting the watermarks embedded in the selected portions and retrieving information that can be used to unequivocally identify the source device together with additional information (such as location data, etc.). Once the source is identified, proper measures can be taken including inhibiting such device from receiving additional multimedia contents also during the live event so to contain the effects of the illegal redistribution. It has to be noted also that the method described is independent on the specific marking generation function and marking application function that may be used.

The invention claimed is:

1. A method for protecting multimedia content distributed by a content service to a user device, the multimedia content being related to a live event, wherein the method comprises, during said live event:
   identifying a significant segment of said live event;
   generating a trigger signal comprising generating a timing signal indicative of the time at which said significant segment is identified;
   at said user device, based on said trigger signal, generating marking information comprising information identifying said user device; and
   at said user device, applying said marking information to a selected portion of the multimedia content, said selected portion corresponding to said significant segment of the live event,
   wherein said identifying said significant segment of said live event is performed with a first delay with respect to a start time of said significant segment of said live event, wherein said first delay is lower than a latency, said latency being indicative of a second delay after which said selected portion is available to be presented to a user with respect to said start time of said significant segment.

2. The method according to claim 1, wherein said marking information comprises a watermark.

3. The method according to claim 2, wherein said trigger signal comprises information indicating one or more areas of a display of said user device at which said watermark is to be applied when said selected portion is shown on said display.

4. The method according to claim 1, wherein said generating the trigger signal comprises, upon said significant segment being identified, automatically generating the timing signal, and wherein said generating said trigger signal is based on the timing signal.

5. The method according to claim 1, further comprising storing said trigger signal in a database.

6. The method according to claim 1, further comprising sending to said user device said trigger signal over a communication link, said communication link being distinct with respect to a further communication link over which said multimedia content is sent to said user device.

7. The method according to claim 1, wherein the significant segment of the live event is a significant interval of the live event associated with a significant action or moment, or with a concatenation of significant actions or moments occurring during the live event.

8. A method for protecting multimedia content distributed by a content service to a user device, the multimedia content being related to a live event, wherein the method comprises, during said live event:
   identifying a significant segment of said live event;
   generating a trigger signal comprising generating a timing signal indicative of the time at which said significant segment is identified;
   at said user device, based on said trigger signal, generating marking information comprising information identifying said user device; and
   at said user device, applying said marking information to a selected portion of the multimedia content, said selected portion corresponding to said significant segment of the live event,
   wherein said trigger signal is an ON/OFF signal, wherein said trigger signal is switched to an ON state at the time at which said significant segment is identified.

9. The method according to claim 8, wherein said identifying said significant segment of said live event is performed with a first delay with respect to a start time of said significant segment of said live event, wherein said first delay is lower than a latency, said latency being indicative of a second delay after which said selected portion is available to be presented to a user with respect to said start time of said significant segment.

10. The method according to claim 8, wherein said marking information comprises a watermark.

11. The method according to claim 8, wherein said generating the trigger signal comprises, upon said significant segment being identified, automatically generating the timing signal, and wherein said generating said trigger signal is based on the timing signal.

12. The method according to claim 8, further comprising sending to said user device said trigger signal over a communication link, said communication link being distinct with respect to a further communication link over which said multimedia content is sent to said user device.

13. The method according to claim 8, wherein the significant segment of the live event is a significant interval of the live event associated with a significant action or moment, or with a concatenation of significant actions or moments occurring during the live event.

14. A method for protecting multimedia content distributed by a content service to a user device, the multimedia content being related to a live event, wherein the method comprises, during said live event:
   automatically identifying a significant segment of said live event based on an outcome of processing of descriptive data related to said live event;
   generating a trigger signal associated with said significant segment;

at said user device, based on said trigger signal, generating a marking comprising information identifying said user device; and at said user device, applying said marking to a selected portion of the multimedia content, said selected portion corresponding to said significant segment of the live event, wherein said identifying the significant segment of said live event is performed with a first delay with respect to a start time of said significant segment of said live event, wherein said first delay is lower than a latency, said latency being indicative of a second delay after which said selected portion is available to be presented to a user with respect to said start time of said significant segment.

15. The method according to claim 14, wherein said marking information comprises a watermark.

16. The method according to claim 15, wherein said trigger signal comprises information indicating one or more areas of a display of said user device at which said watermark is to be applied when said selected portion is shown on said display.

17. The method according to claim 14, wherein said generating the trigger signal comprises, upon said significant segment being identified, automatically generating a timing signal indicative of the time at which said significant segment is identified, and wherein said generating said trigger signal is based on the timing signal.

18. The method according to claim 14, wherein said trigger signal is an ON/OFF signal, wherein said trigger signal is switched to an ON state at the time at which said significant segment is identified.

19. The method according to claim 14, further comprising sending to said user device said trigger signal over a communication link, said communication link being distinct with respect to a further communication link over which said multimedia content is sent to said user device.

20. The method according to claim 14, wherein the significant segment of the live event is a significant interval of the live event associated with a significant action or moment, or with a concatenation of significant actions or moments occurring during the live event.

* * * * *